US011113405B2

(12) United States Patent
Hodgman et al.

(10) Patent No.: US 11,113,405 B2
(45) Date of Patent: Sep. 7, 2021

(54) VULNERABILITY ASSESSMENT

(71) Applicant: Rapid7, Inc., Boston, MA (US)

(72) Inventors: Roy Hodgman, Cambridge, MA (US); Jonathan Hart, Kernville, CA (US)

(73) Assignee: Rapid7, Inc., Boston, MA (US)

( * ) Notice: Subject to any disclaimer, the term of this patent is extended or adjusted under 35 U.S.C. 154(b) by 340 days.

(21) Appl. No.: 15/949,403

(22) Filed: Apr. 10, 2018

(65) Prior Publication Data

US 2019/0311130 A1  Oct. 10, 2019

(51) Int. Cl.
*G06F 21/57* (2013.01)
*H04L 29/06* (2006.01)

(52) U.S. Cl.
CPC ............ *G06F 21/577* (2013.01); *H04L 63/08* (2013.01); *H04L 63/1433* (2013.01)

(58) Field of Classification Search
CPC .... G06F 21/577; H04L 63/08; H04L 63/1433
See application file for complete search history.

(56) References Cited

U.S. PATENT DOCUMENTS

| | | | |
|---|---|---|---|
| 9,686,296 B1 * | 6/2017 | Murchison | H04L 63/1425 |
| 9,846,780 B2 * | 12/2017 | Tonn | G06F 21/577 |
| 2005/0005169 A1 * | 1/2005 | Kelekar | G06F 9/542 |
| | | | 726/4 |
| 2013/0174263 A1 * | 7/2013 | Nunez Di Croce | G06F 16/951 |
| | | | 726/25 |
| 2014/0007241 A1 * | 1/2014 | Gula | H04L 63/1433 |
| | | | 726/25 |
| 2015/0222655 A1 * | 8/2015 | Gula | H04L 67/10 |
| | | | 726/25 |
| 2017/0078309 A1 * | 3/2017 | Allen | G06F 16/285 |

FOREIGN PATENT DOCUMENTS

CN 107577947 A * 1/2018

OTHER PUBLICATIONS

"What is mstsc.exe?", https://www.file.net/process/mstsc.exe.html, Aug. 2017, 5 pages (Year: 2017).*
Chris Hoffman, "How to Enable and Use Windows 10's New Built-in SSH Commands", https://www.howtogeek.com/336775/how-to-enable-and-use-windows-10s-built-in-ssh-commands, Dec. 2017, 7 pages (Year: 2017).*
Ron Gula, "Predicting Attack Paths, Leveraging active and passive vulnerability discovery to identify trusted exploitable weak points in your network", https://static.tenable.com/whitepapers/Predicting_Attack_Paths_v7.pdf, Tenable Network Security, Oct. 23, 2014, 35 pages (Year: 2014).*

* cited by examiner

*Primary Examiner* — Kevin Bechtel
*Assistant Examiner* — Han Yang
(74) *Attorney, Agent, or Firm* — Ashwin Anand

(57) ABSTRACT

Methods and systems for assessing a vulnerability of a network device. The systems and methods described herein combine data regarding locally discovered vulnerabilities and exposed services with data regarding what executables are provided by software installed on the network device.

9 Claims, 4 Drawing Sheets

VULNERABILITY ASSESSMENT

TECHNICAL FIELD

Embodiments described herein generally relate to systems and methods for assessing the vulnerability of a network device.

BACKGROUND

Existing vulnerability assessment tools generally have two methods for gathering data about a host. These existing tools and methods involve (1) logging into the host and capturing a catalog of software running thereon; or (2) scanning the host externally to see what services it exposes. These existing techniques, however, do not provide a comprehensive view of a host's vulnerabilities.

A need exists, therefore, for methods and systems for assessing the vulnerability of a network device that overcome this shortcoming of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for assessing a vulnerability of a network device. The method includes receiving a list of one or more services externally exposed on the network device, receiving an indication of at least one vulnerability in at least one software package installed on the network device, determining whether an externally exposed service is associated with a software package that includes at least one vulnerability, and executing at least one remedial action upon determining that an externally exposed service is associated with a software package that includes at least one vulnerability.

In some embodiments, receiving the list of the one or more services externally exposed on the network device includes receiving at least one of a port and a protocol associated with each of the one or more externally exposed services.

In some embodiments, the contents of the vulnerability indication include a list of services provided by a software package, and a list of ports or protocols to which each of the services provided by the software package are bound; wherein determining whether an externally exposed service is associated with a software package that includes at least one vulnerability includes matching at least some of the contents of the vulnerability indication to an externally exposed service. In some embodiments, receiving the list of one or more services externally exposed on the network device includes receiving data regarding a process responsible for an externally exposed service. In some embodiments, the contents of the vulnerability indication further include data regarding a process responsible for each of the services provided by a software package.

In some embodiments, the method further includes using authentication credentials to connect to a service on the network device.

In some embodiments, executing the at least one remedial action includes elevating the software package for further examination.

In some embodiments, executing the at least one remedial action includes issuing an alert.

According to another aspect, embodiments relate to a system for assessing a vulnerability of a network device. The system includes an interface configured to receive at least a list of one or more services externally exposed on the network device, and an indication of at least one vulnerability in at least one software package installed on the network device; a memory; and a vulnerability assessment module configured to execute instructions stored on the memory to determine whether an externally exposed service is associated with a software package that includes at least one vulnerability, and execute at least one remedial action upon determining that an externally exposed service is associated with a software package that includes at least one vulnerability.

In some embodiments, the received list of the one or more services externally exposed on the network device includes data regarding at least one of a port and a protocol associated with each of the one or more externally exposed services.

In some embodiments, the contents of the vulnerability indication include a list of services provided by a software package and a list of ports or protocols to which each of the services provided by the software package are bound; and the vulnerability assessment module determines whether an externally exposed service is associated with a software package that includes at least one vulnerability by matching at least some of the contents of the vulnerability indication to an externally exposed service. In some embodiments, the received list of one or more services externally exposed on the network device includes data regarding a process responsible for an externally exposed service. In some embodiments, the contents of the vulnerability indication further include data regarding a process responsible for each of the services provided by a software package.

In some embodiments, the vulnerability assessment module is further configured to use authentication credentials to connect to a service on the network device.

In some embodiments, the at least one remedial action includes elevating the software package for further examination.

In some embodiments, the at least one remedial action includes issuing an alert via the interface.

According to yet another aspect, embodiments relate to a computer readable medium containing computer-executable instructions for a method for assessing a vulnerability of a network device. The medium comprises computer-executable instructions for receiving a list of one or more services externally exposed on the network device, computer-executable instructions for receiving an indication of at least one vulnerability in at least one software package installed on the network device, computer-executable instructions for determining whether an externally exposed service is associated with a software package that includes at least one vulnerability, and computer-executable instructions for executing at least one remedial action upon determining that an externally exposed service is associated with a software package that includes at least one vulnerability.

In some embodiments, the computer-executable instructions for receiving the list of the one or more services externally exposed on the network device includes computer-executable instructions for receiving at least one of a port and a protocol associated with one or more externally exposed services.

In some embodiments, the contents of the vulnerability indication include a list of services provided by a software package, and a list of ports or protocols to which each of the services provided by the software packages are bound; and the computer-executable instructions for determining whether an externally exposed service is associated with a software package that includes at least one vulnerability includes computer-executable instructions for matching at least some of the contents of the vulnerability indication to an externally exposed service. In some embodiments, the received list of one or more services externally exposed on the network device includes data regarding a process responsible for an externally exposed service

BRIEF DESCRIPTION OF DRAWINGS

Non-limiting and non-exhaustive embodiments of the invention are described with reference to the following figures, wherein like reference numerals refer to like parts throughout the various views unless otherwise specified.

FIG. 2 presents a screenshot of a list of services listening on a network device in accordance with one embodiment;

FIG. 3 presents a screenshot of a list of services listening on a network device in accordance with another embodiment;

FIG. 4 presents a screenshot of a process list in accordance with one embodiment;

FIG. 5 presents a screenshot listing files provided by a given software package in accordance with one embodiment;

FIG. 6 presents a screenshot listing files provided by a given software package in accordance with another embodiment.

DETAILED DESCRIPTION

Figure 1:
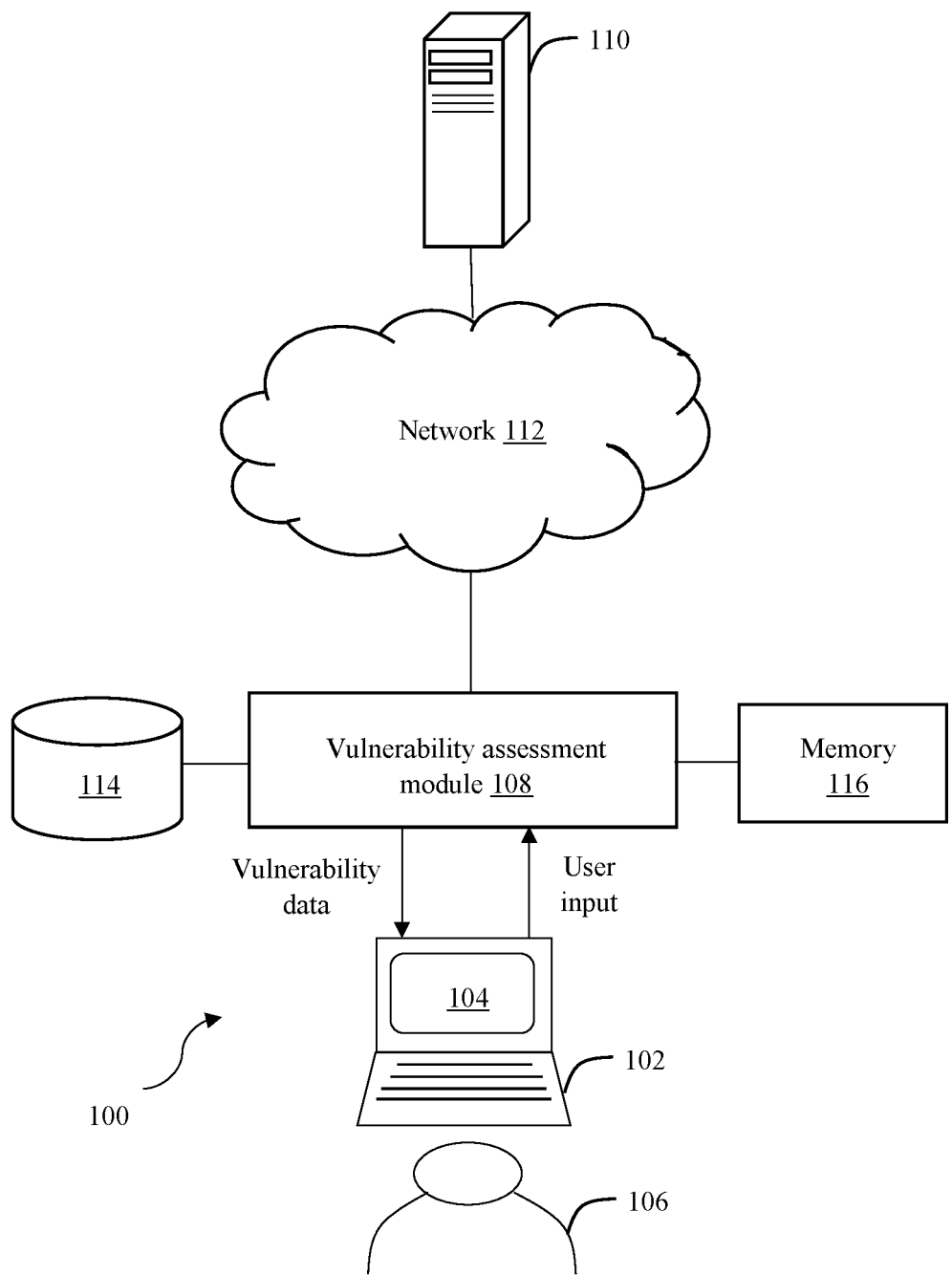
FIG. 1 illustrates a system for assessing a vulnerability of a network device in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The systems and methods described herein may gather data such as the services exposed on a network device, the software installed on the network device, and the processes running on the network device. For example, suppose a network device is exposing a service on a nonstandard port and protocol (e.g., port 23456/TCP). This data may be organized into the below table:

TABLE 1

Vulnerability Assessment Data

| Installed Interior | Running Processes | Exposed Externally |
|---|---|---|
| | | Port: 23456<br>Protocol: TCP |

It may not be readily apparent what service is listening to port 23456 from just the outside scan. However, embodiments of the systems and methods described herein may apply fingerprinting techniques to identify the software installed internally on the network device. For example, these techniques may learn that an old and vulnerable version of Java Virtual Machine (JVM) is installed. Table 1 may be updated accordingly.

TABLE 1

Vulnerability Assessment

| Installed Interior | Running Processes | Exposed Externally |
|---|---|---|
| JVM Version No. x | | Port: 23456<br>Protocol: TCP |

Then, by looking at the processes running on the network device, embodiments of the systems and methods described herein may determine that a process is running that is bound to port 23456/TCP and using the old version of JVM. Table 1 may be updated accordingly.

TABLE 1

Vulnerability Assessment

| Installed Interior | Running Processes | Exposed Externally |
|---|---|---|
| JVM Version No. x | Using JVM and bound to port 23456 | Port: 23456<br>Protocol: TCP |

This data can therefore provide a more complete picture of the network device. By connecting vulnerabilities of installed software to running processes, and identifying whether those processes are externally exposed, embodiments of the systems and methods described herein can provide a more comprehensive and detailed view about vulnerable service areas of the network device.

FIG. 1 illustrates a system for assessing a vulnerability of a network device in accordance with one embodiment. The system 100 may include a user device 102 executing a user interface 104 that is accessible by an operator 106.

The user device 102 may be any suitable device that can execute the user interface 104 to accomplish the features of various embodiments described herein. The user device 102 may be configured as a PC, laptop, tablet, smartphone, smartwatch, or the like.

The user interface 104 may be any suitable software program or application that enables the operator 106 to monitor one or more network devices. The operator 106 may be an IT security personnel or administrator, for example.

The operator 106 may also view data regarding a network device's vulnerability and enter instructions regarding one or more network devices.

The user device 102 may be in operable communication with a vulnerability assessment module 108. The vulnerability assessment module 108 may be in communication with one or more network devices 110 over one or more networks 112. The vulnerability assessment module 108 may be in further communication with one or more databases 114 and memory 116.

The vulnerability assessment module 108 may be any hardware device capable of executing instructions stored on the memory 116 to analyze data regarding the network device's vulnerability. The vulnerability assessment module 108 may include a microprocessor, a field programmable gate array (FPGA), an application-specific integrated circuit (ASIC), or other similar devices. In some embodiments, such as those relying on one or more ASICs, the functionality described as being provided in part via software may instead be configured into the design of the ASICs and, as such, the associated software may be omitted. The vulnerability assessment module 108 may be configured as part of the user device 102 (e.g., a laptop) or may be located at some remote location.

The one or more network devices 110 may be any type of host for which a vulnerability assessment is desired. These network devices 110 may be configured to offer information resources, services, and applications to users and/or other nodes on the network 112.

The network(s) 112 may link the various components with various types of network connections. The network(s) 112 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network or networks 112 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The one or more databases 114 may store data regarding various network devices. The one or more databases 114 may also store data regarding known vulnerabilities of various network devices 110, as well as services executing thereon.

For example, the one or more databases 114 may contain data regarding which versions of which software packages are known to have vulnerabilities. The one or more databases 114 may also store authentication credentials for use by an operator 106 and/or the vulnerability assessment module 108 to access one or more services on a network device 110 (discussed below).

The memory 116 may be L1, L2, L3 cache or RAM memory configurations. The memory 116 may include non-volatile memory such as flash memory, EPROM, EEPROM, ROM, and PROM, or volatile memory such as static or dynamic RAM, as discussed above. The exact configuration/type of memory 116 may of course vary as long as instructions for assessing a vulnerability of the network device 110 can be executed to accomplish the various features described herein.

In use, the vulnerability assessment module 108 or an operator 106 may use the authentication credentials stored in the database 114 to access one or more services on the network device 110. This prioritizes the discovery of services for which authentication credentials or other conditions are present, and therefore allows the vulnerability assessment module 108 to obtain operating system level access to the network device 110.

By utilizing the authenticated (and generally privileged) operating system level access to a network device 110, running processes and other aspects of the network device 110 may be interrogated to determine what services are listening on that network device 110. This advanced knowledge of what services are listening on a network device 110 allows the vulnerability assessment module 108 to speed up this stage of assessment. In other words, the vulnerability assessment module 108 targets what is known to be listening before potentially spending time enumerating additional services, often iteratively and exhaustively.

It is also noted that the service accessed using authentication credentials is not necessarily the service (or endpoint, port, or protocol) that is exposed by a vulnerable software package. That is, the service to which the vulnerability assessment module 108 authenticates can be separate from the service in which the system 100 detects a vulnerability.

The vulnerability assessment module 108 may use a variety of interrogation techniques to determine what services are listening on the network device 110. For example, to determine what services are listening on a UNIX-based network device 110, the vulnerability assessment module could use the netstat utility.

Figures 2, 3:
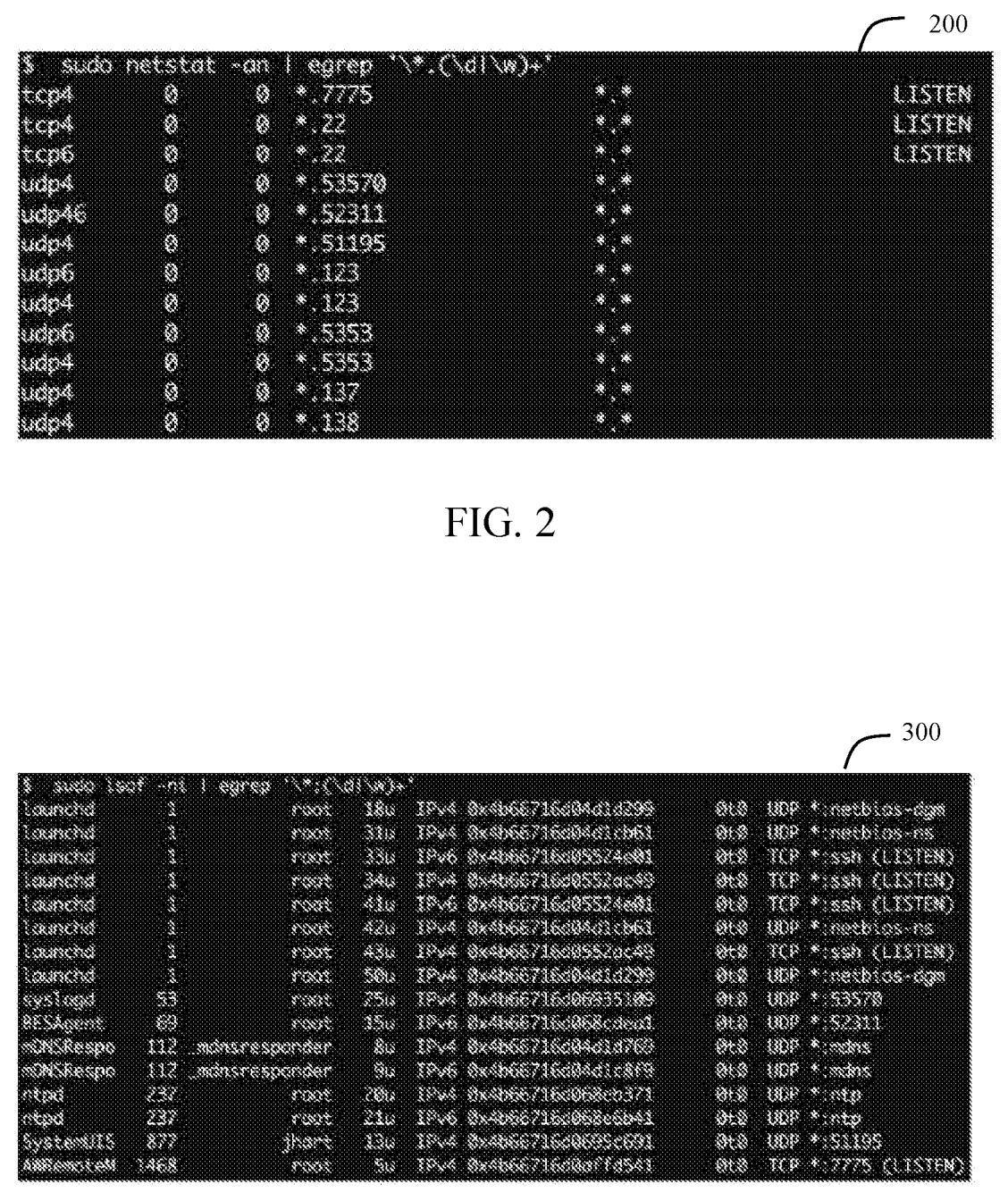

FIG. 2 presents a screenshot 200 of the results of a netstat scan. As seen in FIG. 2, the netstat scan shows that a process is listening on port 7775/TCP and port 22/TCP on all of the network device's IPv4 and IPv6 addresses. The netstat output also shows that there are several UDP services listing on a combination of IPv4 and IPv6 addresses.

Additionally or alternatively, the vulnerability assessment module 108 may use the lsof (list open files) functionality to obtain similar results. FIG. 3 presents a screenshot 300 of the results of an lsof scan. The lsof scan of FIG. 3 shows similar data that is shown in FIG. 2. However, the lsof output also shows which processes and users are executing these services.

There are numerous other tools and techniques that may be used to extract similar information on different types of operating systems. The tools and techniques used to obtain this type of metadata from an operating system may vary as long as they can accomplish the features of various embodiments described herein. These tools and techniques may be carried out by the vulnerability assessment module 108 or some other device.

Figures 4, 5, 6:
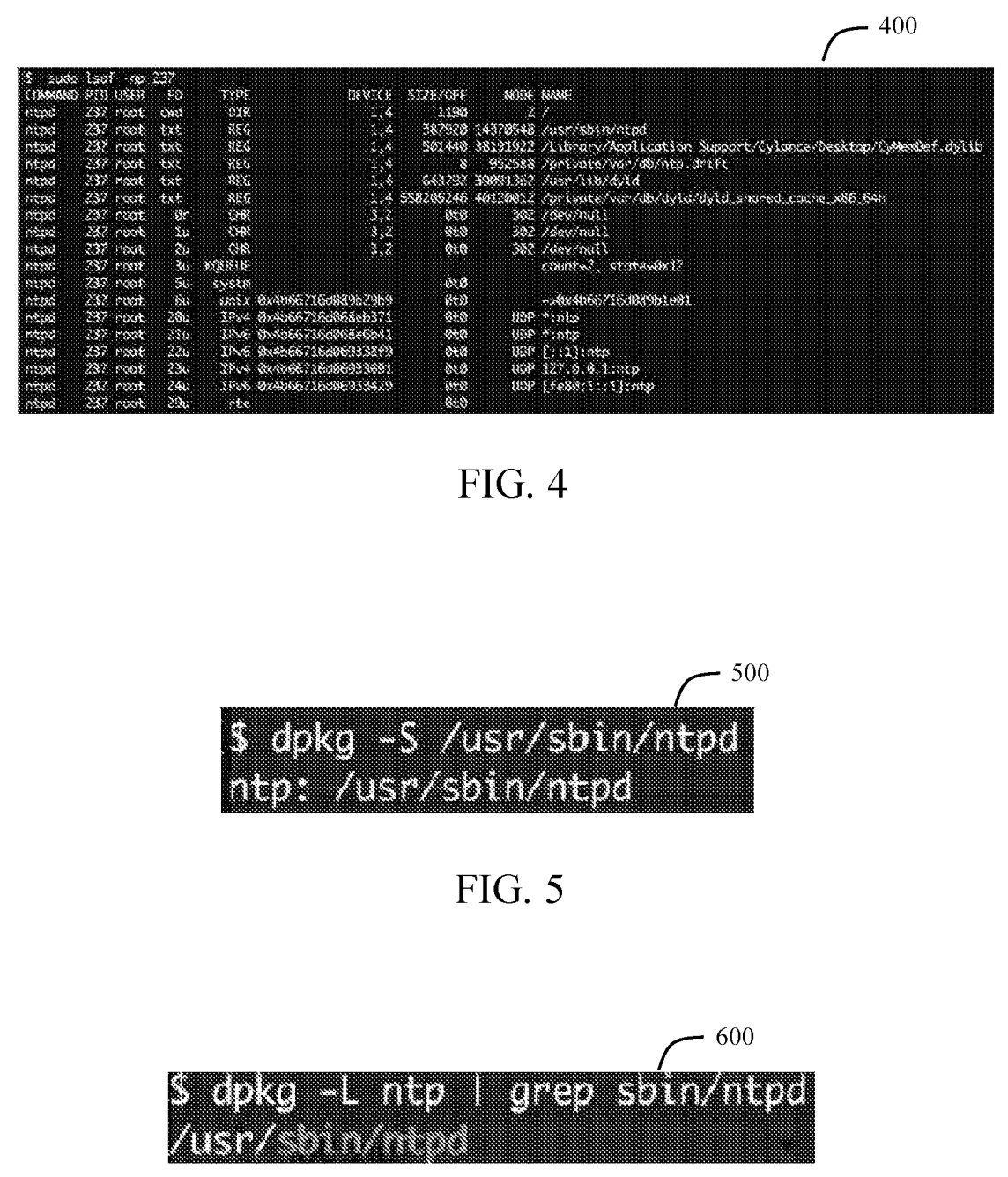

The scans of FIGS. 2 and 3 show that an NTP-like process is listening on port 123/UDP on all IPv4 and IPv6 addresses under process ID 237. The vulnerability assessment module 108 may then inspect this process to determine what else, beyond network services, it has open. FIG. 4 presents a screenshot 400 of data regarding the process with process ID 237. As can be seen, the/usr/sbin/ntpd executable is one of several resources being used by this particular service.

At this point, existing assessment techniques may continue to enumerate what software and versions are installed on a target system. However, any subsequent remediation efforts may be hampered without knowledge of whether particular services are exposed remotely. For example, an assessment process may find several vulnerabilities in installed software, but none of which can be attributed to externally listening services. This would likely represent a less urgent remediation process than if all of these vulnerabilities were remotely addressable and potentially exploitable.

Features of various embodiments described herein therefore bridge this gap by combining knowledge of locally discovered vulnerabilities and remotely exposed services with knowledge of executables provided by the software that are affected by these vulnerabilities.

Referring back to the NTP example introduced above, the vulnerability assessment module 108 may analyze the software packages installed on the network device 110. For example, the vulnerability assessment module 108 may discover that the NTP software package installed is vulnerable to CVE-2013-5211 (e.g., based on knowledge gathered from the database 114).

On Debian-based targets, for example, the vulnerability assessment module 108 may use the dpkg utility to ask what files are provided by a given software package. FIG. 5, for example, presents a screenshot 500 showing that the/usr/sbin/ntpd executable is provided by this vulnerable NTP software package.

This same data can be obtained in a different manner. Under the assumption that a vulnerability scanning product would identify the NTP package as being vulnerable to CVE-2013-5211, the vulnerability assessment module 108 may ask the software package manager what files the NTP package provides to see if/usr/sbin/ntpd is in there. FIG. 6 presents a screenshot 600 showing files provided by the NTP package and, not surprisingly, /usr/sbin/ntpd is there.

The data obtained above may be used together to assess the vulnerability of the network device 110. Combined with the knowledge that this same executable is listening on 123/UDP on all IPv4 and IPv6 addresses, it may be assumed that this vulnerability is remotely exposed and perhaps even remotely exploitable.

Upon detecting that a vulnerability is exposed, the vulnerability assessment module 108 may execute one or more remedial actions. For example, the vulnerability assessment module 108 may issue an alert via the user interface 104. This alert may be an audio-based alert, a visual-based alert, a haptic-based alert, or some combination thereof. Additionally or alternatively, the vulnerability assessment may elevate the software package for further examination.

Figure 7:
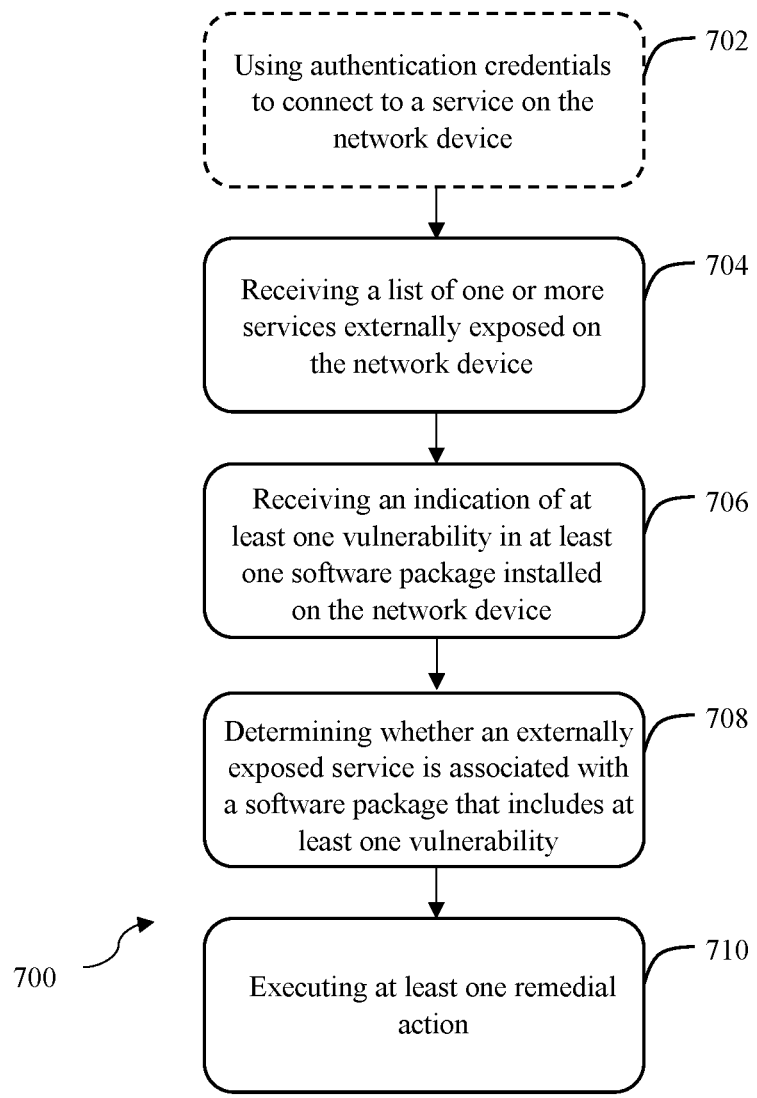
FIG. 7 depicts a flowchart of a method for assessing a vulnerability of a network device in accordance with one embodiment.

FIG. 7 depicts a flowchart of a method 700 for assessing a vulnerability of a network device. The network device may be similar to the device 110 of FIG. 1. Step 702 is optional and involves using authentication credentials to connect to a service on the network device. As mentioned previously, this may allow tools such as the vulnerability assessment module 108 of FIG. 1 to speed up the vulnerability assessment by targeting what is actually known to be listening.

Step 704 involves receiving a list of one or more services externally exposed on the network device. In some embodiments, this may involve receiving data regarding a process responsible for an externally exposed service. Similarly, this data may include at least one of a port and a protocol (or at least a likely protocol) associated with each of the one or more externally exposed services.

Step 706 involves receiving an indication of at least one vulnerability in at least one software package installed on the network device. This step may be performed by detecting the software packages (and versions thereof) installed on the device and assessing whether they are known to be vulnerable.

In some embodiments, the contents of the vulnerability indication may include a list of services provided by a software package and a list of ports or protocols to which each of the services provided by the software package are bound (or are at least usually bound). Additionally, the contents of the vulnerability indication may further include data regarding a process responsible for each of the services provided by a software package.

Step 708 involves determining whether an externally exposed service is associated with a software package that includes at least one vulnerability. In some embodiments, this may involve matching at least some of the contents of the vulnerability indication to the externally exposed service(s).

Step 710 involves executing at least one remedial action upon determining that an externally exposed service is associated with a software package that includes at least one vulnerability. As discussed above, the at least one remedial action may involve issuing an alert and/or elevating a software package for further examination.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method for assessing a vulnerability of a network device, the method comprising:
   receiving a list of one or more services externally exposed on the network device, including receiving at least one of a port and a protocol associated with each of the one or more externally exposed services;
   receiving an indication of at least one vulnerability in at least one software package installed on the network device, wherein contents of the vulnerability indication include a list of services provided by the software package and a list of ports or protocols to which each of the services provided by the software package are bound;
   determining that a process is provided by the software package with the at least one vulnerability;
   determining whether an externally exposed service of the one or more services externally exposed is associated with the process that is provided by the software package with the at least one vulnerability by matching at least some of the ports or protocols in the contents of the vulnerability indication to the port or protocol associated with the externally exposed service; and
   executing at least one remedial action upon determining that the externally exposed service is associated with the process that is provided by the software package with the at least one vulnerability.

2. The method of claim 1 further comprising using authentication credentials to connect to a service on the network device.

3. The method of claim 1 wherein executing the at least one remedial action includes elevating the software package for further examination.

4. The method of claim 1 wherein executing the at least one remedial action includes issuing an alert.

5. A system for assessing a vulnerability of a network device, the system comprising:
   an interface configured to receive at least:
      a list of one or more services externally exposed on the network device, including data regarding at least one of a port and a protocol associated with each of the one or more externally exposed services, and
      an indication of at least one vulnerability in at least one software package installed on the network device, wherein contents of the vulnerability indication include a list of services provided by a software package and a list of ports or protocols to which each of the services provided by the software package are bound;
   a memory; and
   a vulnerability assessment module configured to execute instructions stored on the memory to:
      determine that a process is provided by the software package with the at least one vulnerability,
      determine whether an externally exposed service of the one or more services externally exposed is associated with the process that is provided by the software package with the at least one vulnerability by matching at least some of the ports or protocols in the contents of the vulnerability indication to the port or protocol associated with the externally exposed service, and
      execute at least one remedial action upon determining that the externally exposed service is associated with the process that is provided by the software package with the at least one vulnerability.

6. The system of claim 5 wherein the vulnerability assessment module is further configured to use authentication credentials to connect to a service on the network device.

7. The system of claim 5 wherein the at least one remedial action includes elevating the software package for further examination.

8. The system of claim 5 wherein the at least one remedial action includes issuing an alert via the interface.

9. A non-transitory computer readable storage medium containing computer-executable instructions for a method for assessing a vulnerability of a network device, the medium comprising:
   computer-executable instructions for receiving a list of one or more services externally exposed on the network device, including computer-executable instructions for receiving at least one of a port and a protocol associated with one or more externally exposed services;
   computer-executable instructions for receiving an indication of at least one vulnerability in at least one software package installed on the network device, wherein contents of the vulnerability indication include a list of services provided by a software package and a list of ports to which each of the services provided by the software packages are bound;
   computer-executable instructions for determining that a process is provided by the software package with the at least one vulnerability;
   computer-executable instructions for determining whether an externally exposed service of the one or more services externally exposed is associated with the process that is provided by the software package with the at least one vulnerability by matching at least some of the ports or protocols in the contents of the vulnerability indication to the port or protocol associated with the externally exposed service; and
   computer-executable instructions for executing at least one remedial action upon determining that the externally exposed service is associated with the process that is provided by the software package with the at least one vulnerability.

* * * * *